United States Patent [19]
Hayday et al.

[11] Patent Number: 6,156,074
[45] Date of Patent: *Dec. 5, 2000

[54] BIODEGRADABLE DRY CLEANING SOLVENT

[75] Inventors: William A. Hayday, Woodbury; Stephen P. Bates, Huntington, both of N.Y.

[73] Assignee: Rynex Holdings, Ltd., Hamilton, Bermuda

[*] Notice: This patent is subject to a terminal disclaimer.

[21] Appl. No.: 09/402,412
[22] PCT Filed: Apr. 6, 1998
[86] PCT No.: PCT/US98/06811
  § 371 Date: Jan. 12, 2000
  § 102(e) Date: Jan. 12, 2000
[87] PCT Pub. No.: WO98/45523
  PCT Pub. Date: Oct. 15, 1998

Related U.S. Application Data

[63] Continuation-in-part of application No. 08/833,341, Apr. 4, 1997, Pat. No. 5,888,250.
[51] Int. Cl.[7] .............................. D06L 1/00; D06L 1/02; D06L 1/04; C09B 67/10
[52] U.S. Cl. .......................... 8/142; 8/137; 8/139; 8/609; 510/285; 510/291
[58] Field of Search ................... 510/285, 291; 8/137, 139, 142, 609

[56] References Cited

U.S. PATENT DOCUMENTS

| | | | |
|---|---|---|---|
| 4,648,884 | 3/1987 | Koci | 8/527 |
| 4,943,392 | 7/1990 | Hastedt et al. | 510/406 |
| 5,348,679 | 9/1994 | Weinhold et al. | 510/370 |
| 5,547,476 | 8/1996 | Siklosi et al. | 8/142 |
| 5,840,675 | 11/1998 | Yeazell | 510/439 |
| 5,888,250 | 3/1999 | Hayday et al. | 8/142 |
| 5,891,197 | 4/1999 | Young et al. | 8/137 |
| 5,997,586 | 12/1999 | Smith et al. | 8/142 |
| 6,042,617 | 3/2000 | Berndt | 8/142 |

OTHER PUBLICATIONS

Hall, The Standard Handbook of Textiles, Wiley & Sons, pp. 207–214 and 252–253 (month unknown), 1975.

Kirk Othmer Encyclopedia of Chemical Technology, 4th edition, vol. 8, pp. 545–546 (1993), (month unknown).

*Primary Examiner*—Alan Diamond
*Attorney, Agent, or Firm*—Synnestvedt & Lechner LLP

[57] ABSTRACT

A method of dry-cleaning garments which comprises treating the garments with a mixture of propylene glycol tertiary-butyl ether or propylene glycol n-butyl ether and water.

31 Claims, No Drawings

BIODEGRADABLE DRY CLEANING SOLVENT

CROSS REFERENCE TO RELATED APPLICATION

This application is a 371 of PCT/US98/06811 filed Apr. 6, 1998, which is a C-I-P of U.S. patent application Ser. No. 08/833,341 filed Apr. 4, 1997, now U.S. Pat. No. 5,888,250.

TECHNICAL FIELD

The present invention relates to a novel dry-cleaning solvent and a method for effecting dry-cleaning using said solvent. More particularly, the present invention relates to a solvent which is comparable or superior to perchloroethylene in its attributes and benefits, but which does not suffer from the serious environmental, health and occupational negatives and problems associated with the use of perchloroethylene.

BACKGROUND ART

The most widely used dry-cleaning solvent is perchloroethylene, which is commonly referred to and will be referred to sometimes hereinafter as ("Perc"), which is a chlorinated hydrocarbon-based solvent. It is the dry-cleaning solvent of choice throughout North America, Europe and Asia.

In addition to Perc's use in the dry-cleaning industry, it has found extensive use as a degreasing agent in the metals industry, in scouring/milling and in various "clean room" applications in the semiconductor and electronics industry. The industrial uses of Perc are approximately tenfold greater than its use as a solvent for dry-cleaning.

While Perc has been found to be an effective dry-cleaning agent due to the fact that it does not damage synthetic fabrics or cause shrinkage to fabrics containing naturally occurring fibers, such as wool, as well as being non-flammable and possessed of a relatively low boiling point, which permits its being reclaimed and purified by means of ordinary distillation, it does present a number of other problems which present drawbacks to its use.

In particular, perchloroethylene presents a number of health and environmental hazards which would militate against its continued use, provided a substitute solvent of comparable quality were available which were free of the aforementioned hazards.

Since Perc is heavier than water, its disposal represents a significant environmental risk since it will sink to the bottom of the aquifer, lake, river, etc., with possibly resultant contamination of the water supply. Additionally, Perc vapors have been implicated as having a deterious effect on the central nervous system. In addition, due to its being a highly chlorinated molecule, Perc has been identified as being a significant health hazard to cattle, and as a cause of skin cancer, particularly melanoma, due to the action of the chlorine in Perc depleting oxygen from the ozone layer. Furthermore, and of particular import, is the fact that Perc is not biodegradable and, hence, will, over a period of time accumulate, presenting a significant industrial waste disposal hazard.

As the nature and seriousness of the foregoing problems became more and more manifest with the passage of time and with the completion of various research and clinical investigations into the nature of Perc and its mechanisms of action, the use of alternative solvents has been sought, but none have met with any degree of commercial success since they could not match the results obtained by Perc as a dry-cleaning agent.

However, at this point in time, when environmental concerns are being rigorously monitored and policed by domestic and foreign governments by means of legislation and civil and even criminal prosecution, the need for a substitute solvent for Perc for dry-cleaning operations, as well as other operations, has become a matter of some degree of urgency.

A difficulty in identifying a replacement dry-cleaning solvent for Perc is that it must meet so many requirements, both as to its efficacy as a dry-cleaning agent, i.e., non-shrinking with respect to about 160 types of fabric, dye-fast for non-bleeding with respect to about 900 types of dyes, a high flashpoint to render it non-flammable and non-combustible, the ability to separate from water, effective detergency, distillable, reclaimable, usable with existing dry-cleaning equipment, etc., as well as its being non-polluting to the water supply and the ozone layer, biodegradable, non-toxic, non-carcinogenic, etc.

One proposed solvent substitute, namely, propylene glycol monomethyl ether, which is disclosed in EP 479,146 A2 as possessing many desirable properties, was found to be wanting in that it causes damage to weak dyes and to fine yarns and to delicate fabrics, such as acetates, due to its pronounced tendency to accumulate water. Water accumulation or water-miscibility is also a decided negative from another aspect in that it significantly impairs the efficiency of the dry-cleaning process since the dry-cleaning equipment is burdened with the handling of excessive quantities of water and the solvent stock is diluted and must be brought back to a correct ratio for stability reasons.

SUMMARY OF THE INVENTION

In line with the foregoing, it is an object of the present invention to provide a solvent which possesses comparable, if not superior chemical and physical properties when compared to Perc in dry-cleaning, degreasing of metals, cleaning of electronic components and the scouring and milling of woolens, while, simultaneously, protecting the environment, public health and safety from the many known negatives associated with the use of Perc.

It is a further object of the present invention to provide a dry-cleaning solvent which has a specific gravity less than that of water.

It is still a further object of the present invention to provide a dry-cleaning solvent which minimizes or eliminates shrinkage of woolen garments, prevents or limits the bleeding of dyes, and which is able to treat acetates, silks, virgin wool and other delicate fabrics gently so as to avoid damage.

It is still another object of the present invention to provide a dry-cleaning and degreasing solvent which is non-flammable and which has a sufficiently low boiling point to allow it to be reclaimed and purified via conventional distillation processes.

It is still yet another object of the present invention to provide a dye solution containing dyes that are not water-soluble in a solvent that minimizes or eliminates shrinkage of woolen fabrics and does not damage acetates, silks, virgin wool and other delicate fabrics that penetrates the fabric fibers sufficiently to form a strong dye bond to fabric fibers.

Therefore, according to one embodiment of the present invention, a dry-cleaning composition is provided containing:

a solvent selected from the group consisting of propylene glycol tertiary-butyl ether and propylene glycol n-butyl ether;

an amount of water up to the maximum quantity soluble in the solvent at room temperature; and a fabric softening agent in an amount effective to soften the fabric of garments cleaned with the dry-cleaning composition.

The preferred solvent is PTB in a composition containing up to about 18 percent by weight of water and at least 82 percent by weight of PTB. The dry-cleaning compositions of the present invention absorb water from the garments being dry cleaned. The ability to absorb water increases, as the temperature of the composition increases, so that even compositions that are moisture saturated at room temperature will absorb water from garments when heated. The water is then separated from the solvent by azeotropic distillation, with the recovery of essentially pure PTB or PNB.

Therefore, the present invention also includes a method for dry-cleaning garments using the dry-cleaning compositions of the present invention. Methods in accordance with this embodiment of the present invention treat the garments in a composition containing a solvent selected from propylene glycol tertiary-butyl ether and propylene glycol n-butyl ether, and an amount of water up to the maximum quantity soluble in the solvent at room temperature, for a period of time sufficient to effect dry-cleaning.

The dry-cleaning compositions of the present invention can also be used to clean scoured and milled wool. Methods in accordance with this embodiment of the present invention treat the scoured and milled wool with a dry-cleaning composition containing a solvent selected from propylene glycol tertiary-butyl ether and propylene glycol n-butyl ether, and an amount of water up to the maximum quantity soluble in the solvent at room temperature, to effect cleaning.

The dry-cleaning compositions can also be used in the wool scouring and milling processes as well. In accordance with this embodiment of the present invention, a method of scouring wool is provided characterized by scouring the wool with a composition containing a solvent selected from propylene glycol tertiary-butyl ether and propylene glycol n-butyl ether, and an amount of water up to the maximum quantity soluble in the solvent at room temperature. The solvent compositions of the present invention cleanly dissolve the lanolin contained in the raw wool for subsequent recovery and purification for use as an ingredient in cosmetics and other products.

According to another embodiment of the present invention, a method is provided for milling wool, characterized by milling the wool with a composition containing a solvent selected from propylene glycol tertiary-butyl ether and propylene glycol n-butyl ether, and an amount of water up to the maximum quantity soluble in the solvent at room temperature.

The present invention further incorporates the discovery that water-insoluble dyes that are soluble in aliphatic glycol ethers are soluble in the dry-cleaning compositions of the present invention, to provide dye compositions that may be used to dye non-woolen fabrics with significantly improved colorfastness. The drying times of fabrics dyed with the dye compositions of the present invention is significantly decreased as well, yet at the same time, a stronger bond between the dye molecules and the fabric fibers is formed.

Therefore, according to another aspect of the present invention, a composition for dyeing fabrics is provided that is a solution of an aliphatic glycol ether-soluble dye dissolved in a mixture of a solvent selected from propylene glycol tertiary-butyl ether and propylene glycol n-butyl ether, and an amount of water up to the maximum quantity soluble in the solvent at room temperature.

According to yet another embodiment of the present invention, a method is provided for dyeing fabric with the dye compositions of the present invention. Methods in accordance with this aspect of the present invention treat the fabric for a period of time sufficient to effect dyeing with a dye composition containing a solution of an aliphatic glycol ether soluble dye dissolved in a solvent selected from propylene glycol tertiary-butyl ether and propylene glycol n-butyl ether, and an amount of water up to the maximum quantity soluble in the solvent at room temperature. Methods in accordance with the present invention further include the step of drying the fabric after the step of treating the fabric to effect dying is completed.

Other features of the present invention will be pointed out in the following description and claims, which disclose the principles of the invention and the best modes which are presently contemplated for carrying them out.

BEST MODE OF CARRYING OUT THE INVENTION

It has been found that when propylene glycol tertiary-butyl ether (PTB) and propylene glycol n-butyl ether (PNB) are used in the dry-cleaning of garments, both solvents possess all of the attributes associated with perchloroethylene and none of its drawbacks. Furthermore, both propylene glycol tertiary-butyl ether and propylene glycol n-butyl ether also have certain significant advantages not possessed by perchloroethylene. For instance, by using a mixture of either PTB or PNB and water, the water component is effectively tied-up, thus avoiding the tendency of woolen garments to shrink in water, while simultaneously preventing damage to acetates. Further, the water component lowers the solvent boiling points and raises the flashpoints.

It has also been determined that solutions of PTB or PNB and water are effective in the cleaning of scoured and milled raw wool, as well as in the scouring of the raw wool, which involves the pulling of oils and fatty acids, e.g., lanolin, from wool and in the milling of the yarns formed therefrom. Such scouring and milling operations are conducted in dry-cleaning machinery employing otherwise conventional scouring and milling techniques.

A particular advantage of other PTB-water and PNB-water mixtures of the present invention in dry-cleaning is that they do not behave like a typical mixture, but, rather, their behavior is the same as a single substance. This permits a better defined separation upon azeotropic distillation at a lower boiling point and also facilitates reclamation more effectively, at a level of 99 percent or greater, and also enhances purification using conventional distillation techniques.

Of particular note, from an economic as well as an operational standpoint, is the ability of PTB and PNB to separate from water by azeotropic distillation. This is of particular significance in dry-cleaning since garments entering a dry-cleaning plant contain water in the form of moisture. If water were not separable from the PTB or PNB solvent, by azeotropic distillation, the solvent would be diluted with free water and, thus, the dry-cleaning process, and its efficiency, would be seriously compromised, as would the reclaimability of the PTB or PNB.

From the perspective of performance, the PTB and PNB will enhance the ability to dry and clean woolen and cotton garments since those types of garments will be subjected to little, if any, shrinkage due to the fact that PTB and PNB have a limited degree of miscibility with water. Additionally, this limited degree of miscibility avoids dilution of the solvent stock with its attendant problems, which are not inconsiderable when one considers the need to replenish the solvent.

PTB and PNB are very effective dry-cleaning solvents since their detergency action breaks down solvent-soluble stains, which account for 15 percent of all stains found in garments and which are caused by fatty acids. The detergency of the solvent occurs by lifting the soiled area from a surface and by displacing it with surface active materials that have a greater affinity for the surface than they do for the soiled area. It can also deal most effectively with water-soluble stains, which account for more than 80 percent of stains encountered in dry-cleaning, such as, for example, stains from fruit, blood, urine, sweat, etc. It has also been found to limit the bleeding of dyes and to avoid the shrinkage of man-made polymers, such as acetates.

From the standpoint of health and safety, which, as previously mentioned, are of significant importance in the present era, the compositions of the present invention containing PTB and PNB are non-flammable, non-combustible, non-carcinogenic, non-toxic and, of the utmost import, biodegradable. The compositions weigh less than water, i.e., the specific gravity is less than that of water.

The compositions of the present invention containing PTB and PNB dry at a relatively low temperature, namely, about 55° C., which is well within the drying requirements for fabrics constructed of fine yarns so as to avoid damage thereto by excessive heat.

In preparing the compositions of the present invention, either PTB or PNB and water are combined with an amount of water up to the maximum quantity soluble in the PTB or PNB at room temperature. If necessary, water may be added to the PTB or PNB to obtain the desired ratio of solvent and water. Greater than about 18 percent by weight of water will result in the shrinkage of woolen garments, or, conversely, if the quantity of PTB or PNB is increased, damage to acetate fabrics can occur, accompanied by increased bleeding of dyes. It is therefore preferable that the quantity of PTB or PNB be maintained at less than 90 percent by weight, and even more preferably less than 85 percent by weight. At those percentages, it is still an effective dry-cleaning solvent. Most preferably, as stated previously, is the use of about 82 percent by weight of PTB and about 18 percent by weight of water, which provides the best dry-cleaning results combined with the most efficient and cost-effective dry-cleaning operation.

While PTB and PNB can quite successfully and efficiently clean garments made of all types of textile fabrics without the need for additional agents, such as detergents and fabric softeners, it is desirable to include in the formulation one or more surfactants to enhance the detergency action of the PTB or PNB, by means of reducing the surface tension of the composition. Exemplary surfactants are fatty alcohol polyethylene glycol ethers and linear primary alcohol ethoxylates. While fabric softening agents are not necessary to achieve effective dry-cleaning, they are beneficial and serve to enhance the dry-cleaning process.

It has also been determined that the mixtures of PTB or PNB and water of the present invention are effective solvents for water-insoluble dyes and the dyeing of fabrics. Dye compositions can be prepared by dissolving aliphatic glycol ether-soluble dyes in the mixtures of PTB or PNB and water of the present invention. Dyes that are water-insoluble but soluble in aliphatic glycol ethers can be readily identified by those of ordinary skill in the art without undue experimentation by performing simple solubility testing. Classes of water-insoluble dyes include basic or cationic dyes, dispersed dyes and vat dyes. Dye compositions are prepared by mixing an effective amount of the dye with a heated mixture of PTB or PNB and an amount of water up to the maximum quantity soluble at room temperature until the dye is completely dissolved in the mixture of PTB or PNB and water.

Fabric dyeing can be conducted using conventional dyeing equipment, or by using dry-cleaning machinery. The mixture of PTB or PNB and water not only functions to dissolve the dye, it also promotes the penetration of the dye into the fabric fiber to form a stronger bond between the dye molecule and the fabric fiber.

After the dyeing is completed, the fabric is dried by essentially conventional techniques. Fabrics dyed with aliphatic glycol ether-soluble dyes dissolved in a mixture of PTB or PNB and water exhibit faster drying times than fabrics dyed with water-based dyes. However, the greatest advantage is that the mixtures of PTB or PNB and water permit the use of water-insoluble dyes to dye fabrics that are colorfast when the dyed fabrics are subsequently washed in water.

The following examples are set forth to illustrate more clearly the principle and practice of the present invention. It is to be understood, of course, that the invention is not limited to the specific examples.

EXAMPLE 1

One of the most significant properties that a dry-cleaning solvent should possess is limited fiber shrinkage to ensure that fibers comprising the garment do not shrink excessively. Excessive shrinkage, naturally, deforms the garment rendering it unsuitable for future wear. Accordingly, the dry-cleaning solvent which is employed must not excessively shrink the component fibers which comprise the fabric of the garment. In contemporary usage, garments containing virgin wool and acetates, such as the lining found in men's jackets, can ill-afford shrinkage beyond established norms.

A shrinkage test was conducted with respect to virgin wool by taking a series 4"×4" patterned virgin wool swatches and immersing them in separate containers containing each of the azeotropic solvents set forth in Table I below. Approximately 10 minutes of mechanical action was applied to ensure that the wool fibers became totally saturated. The test swatch was then removed and dried at a constant temperature not exceeding 55° C. The test swatch was then compared with a control material to identify any changes in the fibers to ensure that the patterns had not changed their dimensions.

Each of the test solvents was then analyzed to identify any fiber loss. The maximum shrinkage should not exceed 2 percent on the first immersion test and is usually expected to be less than 0.25 percent in any subsequent immersion test.

TABLE I

| Solvent | % Shrinkage On 1$^{st}$ Immersion |
| --- | --- |
| PM (propylene glycol methyl ether) | 2% |
| PNP (propylene glycol n-propyl ether) | 2% |
| DPM (dipropylene glycol methyl ether) | 2% |

TABLE I-continued

| Solvent | % Shrinkage On 1st Immersion |
|---|---|
| PERC (perchloroethylene) | 2% |
| PTB (propylene glycol tertiary-butyl ether) | ½% |

EXAMPLE 2

The shrinkage test conducted in Example 1 was repeated with 4"×4" swatches of acetate fabric. The results are set forth below in Table II, wherein it is evident from an examination of the results therein, and in Table I, that propylene glycol tertiary-butyl ether mixtures resulted in the smallest percentage of shrinkage in both virgin wool and acetate fabrics and, in fact, reduced shrinkage by about 400 percent or greater compared with the other solvents, including Perc, when employed with virgin wool, and an even greater percentage when employed with acetate fabrics.

TABLE II

| Solvent | % Shrinkage On 1st Immersion |
|---|---|
| PM (propylene glycol methyl ether) | 3% |
| PNP (propylene glycol n-propyl ether) | 3% |
| DPM (dipropylene glycol methyl ether) | 2–5% |
| PERC (perchloroethylene) | 2% |
| PTB (propylene glycol tertiary-butyl ether) | ½% |

EXAMPLE 3

The bleeding of dyestuffs is the bane of the dry-cleaners existence. The variety of dyestuffs, their differing chemical structures, the degree to which they are soluble or insoluble in the particular dry-cleaning solvent employed, etc., present manifold problems which must be met, addressed and solved before a new dry-cleaning solvent can be introduced successfully.

Dye-bleeding tests were conducted by taking test swatches of virgin wool, 1"×1", and immersing them in separate containers filled with each of the azeotropic solvent mixtures indicated in Table III below. Ball bearings were added to each of the containers to increase the impact of mechanical action on the dyes in an effort to dislodge the dyes from the fabric. The increased mechanical action was applied for a period of 10 minutes. Thereafter, the test swatch and the ball bearings were removed from the solvent. Colorimeter tests employing a Bausch Lomb Spec-20 calorimeter were conducted on the solvent remaining, which serves to indicate the relative quantity of dye removed by the test swatch. The results are set forth below in Table III with respect to the various solvents tested on virgin wool swatches which had been dyed red, green, yellow, blue and purple, respectively. The greater the value, the greater the degree of dye-bleeding.

TABLE III

| | DYE BLEEDING | | | | |
|---|---|---|---|---|---|
| Solvent | Red | Green | Yellow | Blue | Purple |
| PM | 8 | 7 | 7 | 8 | 8 |
| PNP | 6 | 4 | 4 | 5 | 6 |

TABLE III-continued

| | DYE BLEEDING | | | | |
|---|---|---|---|---|---|
| Solvent | Red | Green | Yellow | Blue | Purple |
| DPM | 6 | 3 | 5 | 5 | 6 |
| Perc | 2 | 2 | 1 | 1 | 3 |
| PTB | 2 | 1 | 1 | 2 | 1 |

EXAMPLE 4

In similar fashion to Example 3 above, swatches of various colored acetate fabrics were tested to determine dye bleeding in the below-listed solvents. The results are set forth in Table IV below.

TABLE IV

| | DYE BLEEDING | | | | |
|---|---|---|---|---|---|
| Solvent | Red | Green | Yellow | Blue | Purple |
| PM | 9 | 8 | 9 | 9 | 8 |
| PNP | 9 | 8 | 8 | 8 | 8 |
| DPM | 8 | 8 | 8 | 9 | 8 |
| Perc | 1 | 1 | 1 | 2 | 2 |
| PTB | 2 | 1 | 1 | 2 | 2 |

It is clearly evident from Tables III and IV that the azeotropic solvent of the present invention, namely, propylene glycol tertiary-butyl ether (PTB), is far superior to PM, PNP and DPM, and is comparable to Perc, as respects dye bleeding, whether the fabric employed is virgin wool or acetate. In point of fact, the solvent of the present invention was in each instance, regardless of fabric type or dye color, significantly more effective in preventing the bleeding of dyes when compared with the non-Perc solvents.

EXAMPLE 5

TABLE V

| TYPE OF STAIN | PERC W/SOAP | PTB W/O SOAP |
|---|---|---|
| Shoe Polish | 50% | 50% |
| Lipstick | 60% | 70% |
| Face Powder | 100% | 100% |
| Ketchup | 40% | 70% |
| Salad Dressing | 70% | 80% |
| Animal Fat | 80% | 80% |
| Mascara | 90% | 90% |
| Mayonnaise | 90% | 90% |
| Coffee | 30% | 60% |
| Ink | 30% | 40% |
| Motor Oil | 80% | 80% |
| Syrup | 80% | 90% |

It is evident with respect to each of the stains enumerated, which are quite typically encountered by dry-cleaners, that the PTB and PNB compositions of the present invention performed as well as or better than Perc, which is the most prevalent solvent employed in dry-cleaning today.

STATEMENT OF INDUSTRIAL APPLICABILITY

The compositions and methods of the present invention are useful in the dry-cleaning of garments, the scouring and milling of raw wool and the dyeing of fabrics with water-insoluble, aliphatic glycol ether-soluble dyes. As will be readily appreciated, numerous variations and combinations of the features set forth within the foregoing description and examples can be utilized without departing from the present invention.

The foregoing examples are intended to be illustrative only and are not to be deemed as in any way limiting the scope of the appended claims.

What is claimed is:

1. A composition for dry-cleaning garments, comprising propylene glycol tertiary-butyl ether (PTB), up to about 18% by weight of water and a fabric softening agent in an amount effective to soften the fabric of garments cleaned with the dry-cleaning composition.

2. The composition of claim 1, characterized by the propylene glycol tertiary-butyl ether being present at a level of about at least 82 percent by weight.

3. The composition of claim 2, characterized by the propylene glycol tertiary-butyl ether being present at a level no greater than about 90 percent by weight.

4. The composition of claim 1, further characterized by an effective amount of a surfactant.

5. A composition for dry-cleaning garments, comprising propylene glycol n-butyl ether (PNB), up to about 18% by weight of water, and a fabric softening agent in amount effective to soften the fabric of garments cleaned with the dry-cleaning composition.

6. The composition of claim 5, further characterized by an effective amount of a surfactant.

7. A method of dry-cleaning garments, comprising treating the garments for a period of time sufficient to effect dry-cleaning in a dry-cleaning composition comprising propylene glycol tertiary-butyl ether (PTB) and up to about 18% by weight of water.

8. A method of dry-cleaning garments, comprising treating the garments for a period of time sufficient to effect dry-cleaning in a dry-cleaning composition comprising propylene glycol n-butyl ether (PNB) and up to about 18% by weight of water.

9. The method of claim 7 or 8, characterized in that the period of time is sufficient to remove solvent-soluble and water-soluble stains.

10. The method of claim 7, characterized in that said propylene glycol tertiary-butyl ether is present in said dry-cleaning composition at a level of at least about 82 percent by weight.

11. The method of claim 10, characterized in that said propylene glycol tertiary-butyl ether is present in said dry-cleaning composition at a level no greater than about 90 percent by weight.

12. The method of claim 7 or 8, characterized in that said dry-cleaning composition further comprises a fabric softening agent present in an amount effective to soften the fabric of the treated garments.

13. The method of claim 7 or 8, characterized in that said dry cleaning composition further comprises a surfactant.

14. A method of cleaning scoured and milled wool, comprising treating the scoured and milled wool with a composition to effect cleaning, said composition comprising propylene glycol tertiary-buty ether PTB) and up to about 18% by weight of water.

15. A method of cleaning scoured and milled wool, comprising treating the scoured and milled wool with a composition to effect cleaning, said composition comprising propylene glycol n-butyl ether (PNB) and up to about 18% by weight of water.

16. The method of claim 14, characterized in that said propylene glycol tertiary-butyl ether is present in said composition at a level of at least about 82 percent by weight.

17. The method of claim 16, characterized in that said propylene glycol tertiary-butyl ether is present in said composition at a level no greater than about 90 percent by weight.

18. The method of claim 14 or 15, characterized in that said dry cleaning composition further comprises an effective amount of a surfactant.

19. A composition for dyeing fabrics comprising a solution of a water-insoluble dye that is soluble in an aliphatic glycol ether and is selected from the group consisting of cationic dyes, dispersed dyes and vat dyes, dissolved in a solvent comprising propylene glycol tertiary-butyl ether (PTB) and/or propylene glycol n-butyl ether (PNB) and up to about 18% by weight of water.

20. The composition of claim 19, wherein said solvent comprises at least about 82% by weight of said propylene glycol tertiary-butyl ether.

21. The composition of claim 20, wherein said solvent comprises no greater than about 90% by weight of said propylene glycol tertiary butyl ether.

22. The composition of claim 19, further comprising an effective amount of a surfactant.

23. A method of dyeing fabric, comprising treating the fabric to effect dyeing with a dye composition comprising a solution of a water-insoluble dye that is soluble in an aliphatic glycol ether and is selected from the group consisting of cationic dyes, dispersed dyes and vat dyes, dissolved in a solvent comprising propylene glycol tertiary-butyl ether (PTB) and/or propylene glycol n-butyl ether (PNB) and up to about 18% by weight of water.

24. The method of claim 23, further comprising the step of drying said fabric after said dyeing has been effected.

25. The method of claim 23, wherein said solvent comprises at least about 82% by weight of said propylene glycol tertiary-butyl ether.

26. The method of claim 25, wherein said solvent comprises no more than about 90% by weight of said propylene glycol tertiary-butyl ether.

27. The method of claim 23, characterized in that said dye composition further comprises an effective amount of a surfactant.

28. A method of scouring raw wool comprising scouring the wool with a composition comprising propylene glycol tertiary-butyl ether (PTB) and up to about 18% by weight of water.

29. A method of scouring raw wool comprising scouring the wool with a composition comprising propylene glycol n-butyl ether (PNB) and up to about 18% by weight of water.

30. A method of milling scoured raw wool, comprising milling the wool with a composition comprising propylene glycol tertiary-butyl ether (PTB) and up to about 18% by weight of water.

31. A method of milling scoured raw wool, comprising milling the wool with a composition comprising propylene glycol n-butyl ether and up to about 18% by weight of water.

* * * * *

UNITED STATES PATENT AND TRADEMARK OFFICE
CERTIFICATE OF CORRECTION

PATENT NO. : 6,156,074
DATED : December 5, 2000
INVENTOR(S) : William A. Hayday and Stephen P. Bates Page 1 of 1

It is certified that error appears in the above-identified patent and that said Letters Patent is hereby corrected as shown below:

Column 1,
Line 52, change "deterious" to read -- deleterious --;

Column 4,
Line 18, change "dying" to read -- dyeing --;
Line 47, change "other" to read -- the --;

Column 5,
Line 34, delete "and water"; and

Column 9,
Line 59, insert an open parenthesis -- ( -- after "ether" and before "PTB".

Signed and Sealed this

Sixteenth Day of October, 2001

Attest:

NICHOLAS P. GODICI
Attesting Officer    Acting Director of the United States Patent and Trademark Office